United States Patent
Stillman et al.

(10) Patent No.: US 6,870,915 B2
(45) Date of Patent: Mar. 22, 2005

(54) PERSONAL ADDRESS UPDATES USING DIRECTORY ASSISTANCE DATA

(75) Inventors: Scott T. Stillman, Peachtree City, GA (US); John Jeffrey Decker, Decatur, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 10/393,103

(22) Filed: Mar. 20, 2003

(65) Prior Publication Data
US 2003/0179866 A1 Sep. 25, 2003

Related U.S. Application Data
(60) Provisional application No. 60/365,916, filed on Mar. 20, 2002.

(51) Int. Cl.[7] .................................................. H04M 3/42
(52) U.S. Cl. ............................ 379/201.01; 379/213.01; 379/218.01
(58) Field of Search ........................... 379/67.1, 88.01, 379/88.02, 88.03, 88.04, 142.01, 201.01, 201.02, 207.02, 207.11, 207.15, 213.01, 218.01, 355.04; 704/270, 270.1, 275

(56) References Cited

U.S. PATENT DOCUMENTS

| | | | | |
|---|---|---|---|---|
| 4,979,206 A | * | 12/1990 | Padden et al. | 379/88.01 |
| 5,259,026 A | * | 11/1993 | Johnson | 379/216.01 |
| 5,274,695 A | * | 12/1993 | Green | 379/88.02 |
| 5,636,267 A | * | 6/1997 | Utsumi et al. | 379/88.01 |
| 5,644,625 A | * | 7/1997 | Solot | 379/88.22 |
| 5,732,132 A | * | 3/1998 | Hamada | 379/354 |
| 5,802,149 A | * | 9/1998 | Hanson | 379/88.03 |
| 5,892,820 A | * | 4/1999 | Armstrong et al. | 379/213.01 |
| 6,163,596 A | * | 12/2000 | Gelfer et al. | 379/67.1 |
| 6,226,375 B1 | * | 5/2001 | Shaffer et al. | 379/142.17 |
| 6,351,636 B2 | * | 2/2002 | Shaffer et al. | 455/414.1 |
| 6,553,116 B1 | * | 4/2003 | Vander Meiden | 379/355.08 |

* cited by examiner

Primary Examiner—Scott L. Weaver
(74) Attorney, Agent, or Firm—Merchant & Gould

(57) ABSTRACT

Methods and systems are provided for storing directory assistance information in a subscriber's electronic address book for future use. If a directory number associated with the desired called party is not in the subscriber's address book, a voice services node initiates a call to a directory assistance service to obtain a directory number for the called party. If the subscriber would like to have the obtained number added to the subscriber's address book, the directory number, name and address associated with the requested directory assistance may be added to the subscriber's address book for future use by the subscriber when the subscriber needs the directory number associated with the called party.

18 Claims, 5 Drawing Sheets

PERSONAL ADDRESS UPDATES USING DIRECTORY ASSISTANCE DATA

This application claims the benefit of Provisional Application Ser. No. 60/365,916 filed Mar. 20, 2002.

FIELD OF THE INVENTION

This invention relates to methods and systems for obtaining and storing directory assistance data to a subscriber electronic address book.

BACKGROUND OF THE INVENTION

With the advent of modern telecommunications systems, users of telephonic systems including wireline and wireless telephones, pagers and the like, are contacted via an address consisting of a directory number. A directory number is generally a number that is dialed or input by an originating party at an originating station to reach a terminating station associated with the directory number. A directory number, typically a ten digit number, is commonly referred to as a "telephone number" and may be assigned to a specific telephone line. In order to contact a user at her telephone or pager, the directory number assigned to the user's telephone, pager, or telephone line is dialed by a calling party using the calling party's telephone, pager, or other telephonic device.

Given the enormous number of telecommunications systems, users and associated directory numbers, a number of telecommunications service provider and third party service provider directory assistance services have been developed. A typical directory assistance service includes a large database containing the names, addresses, and directory numbers for a number of telecommunications systems subscribers. According to a common practice, a user desiring the directory number of another party dials a directory assistance access code, for example "411", to be connected to a local or third party directory assistance service. Once connected to the service, the user may provide the name and/or address associated with the requested directory number to a human operator or to a voice activated directory assistance system. If the requested directory number is located, the number is provided to the user by the operator or via a recorded message file. Often, the provision of the directory number is accompanied by an offer to automatically connect the user to the requested directory number. Unfortunately, under such systems, the user must memorize the directory number for future use, manually record the directory number for future use, or the user must call back to the directory assistance service each time the user needs the requested directory number.

Some prior telecommunications systems allow users to establish address books in a local or remote database where a number of directory numbers may be saved for use by the user. The user may select directory numbers from the user's personal address book, or by using a voice activated dialing system a user may be automatically connected to a called party whose number is in the user's address book. Unfortunately, if a desired called party's directory number is not in the user's personal address book, the user must disconnect the call and place a second call to a directory assistance service. After the user finally gets a directory number from directory assistance, the user must memorize the number, record the number or call back to directory assistance for subsequent use of the number. If the user wants to add the new number to her personal address book, the user must contact her service provider and manually update her address book with the new number.

It is with respect to these and other considerations that the present invention has been made.

SUMMARY OF THE INVENTION

Embodiments of the present invention solve the above and other problems by providing methods and systems for storing directory assistance information to a subscriber's electronic address book for future use. Generally described, a subscriber requests directory assistance via a voice services node. After the subscriber submits a name and/or address to the voice services node, the voice services node queries a subscriber's electronic address book to determine whether a directory number associated with the request is present in the subscriber's address book. If a directory number associated with the request is in a subscriber's address book, the number may be provided to the subscriber, and if desired, a call between the subscriber and a called party associated with the requested directory number may be automatically placed for the subscriber.

If a directory number associated with the desired called party is not in the subscriber's address book, the voice services node may play a prompt to the subscriber asking the subscriber whether additional directory assistance is required. If the subscriber desires additional directory assistance, the voice services node initiates a call to a directory assistance service of the subscriber's telecommunications service provider or of a third party directory assistance provider. After a directory number is obtained from the directory assistance service, the voice services node records the number, performs digit recognition on the number and queries a customer profile database to determine whether a customer profile associated with the subscriber is established. If no customer profile is established for the subscriber, then no address book will be established and, consequently, no attempt will be made to store the obtained number. The subscriber may be prompted to establish a customer profile and address book. If not, the directory number may be provided to the subscriber, and if desired, a call may be automatically placed for the subscriber to the called party via the directory number provided to the subscriber.

If a customer profile is established in the customer profile database for the subscriber, the voice services node may prompt the subscriber to determine whether the obtained directory number should be added to a subscriber's address book. If not, the number may be provided to the subscriber, and if desired, a call may be automatically placed for the subscriber to a called party via the obtained directory number. If the subscriber would like to have the obtained number added to the subscriber's address book, the directory number, name and address associated with the requested directory assistance is added to the subscriber's address book for future use by the subscriber when the subscriber needs the directory number associated with the desired called party. After the directory number, name and address associated with the desired called party is added to the subscriber's address book, the number may be provided to the subscriber to allow the subscriber to dial the called party via the obtained directory number. Alternatively, if desired, a call may be automatically placed to the called party for the subscriber via the obtained directory number. If desired, a notification may be sent by the voice services node to the called party to notify the called party that his/her telephone directory number has been obtained by the subscriber and has been added to the subscriber's address book.

These and other features, advantages and aspects of the present invention may be more clearly understood and

DETAILED DESCRIPTION OF THE PREFERRED EMBODIMENT

Figure 1:
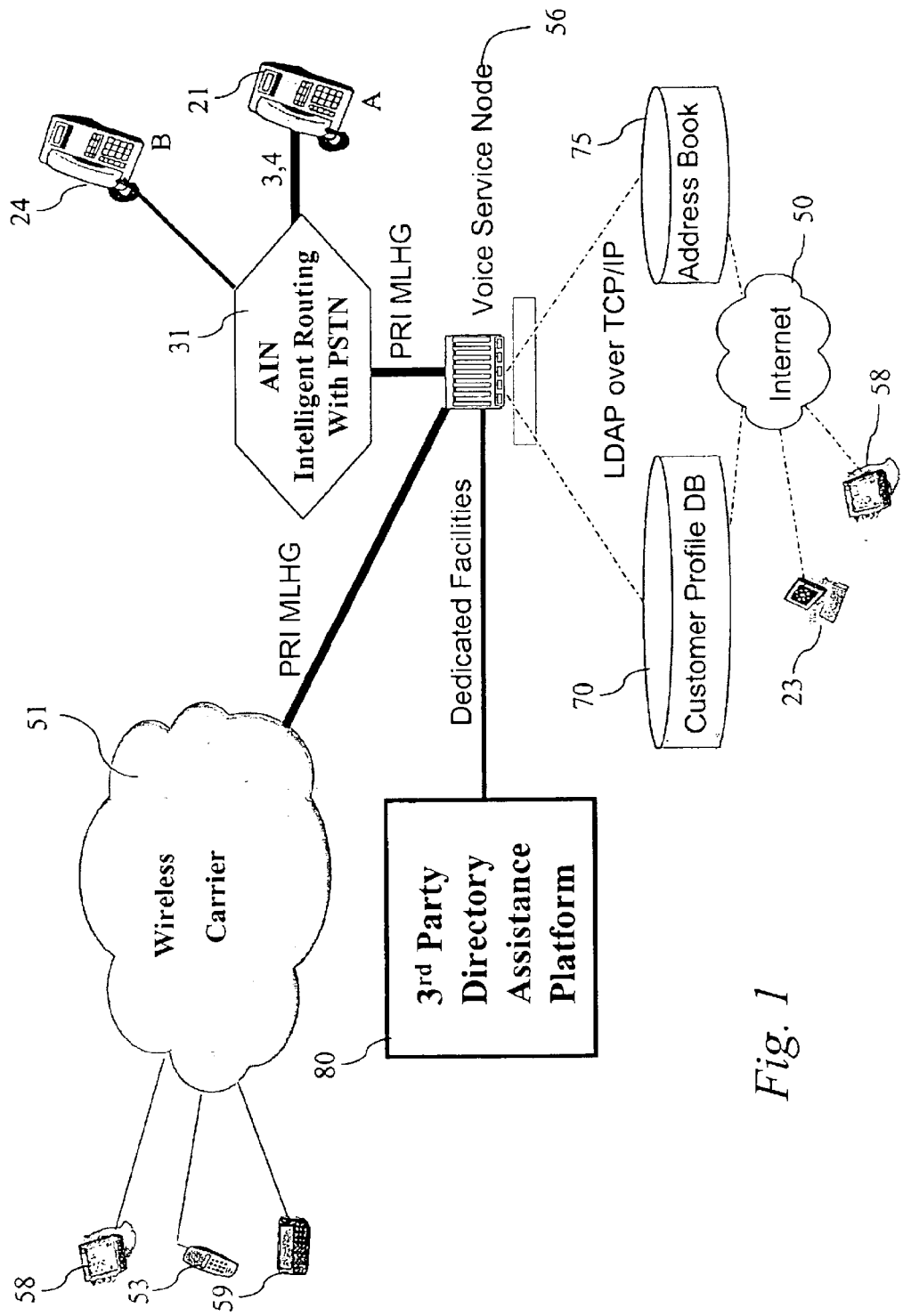
FIG. 1 is a simplified block diagram illustrating components of a wireline and wireless communications network and illustrating interaction between a voice services node and a customer profile database and subscriber address book.

As described briefly above, embodiments of the present invention provide methods and systems for obtaining and storing directory assistance services data to a subscriber address book. These embodiments may be combined, other embodiments may be utilized, and structural changes may be made without departing from the spirit and scope of the present invention. The following detailed description is, therefore, not to be taken in a limiting sense, and the scope of the present invention is defined by the pending claims and their equivalents. Referring now to the drawings, in which like numerals refer to like components or elements throughout the several figures, aspects of the present invention and an exemplary operating environment will be described.

FIG. 1 is a simplified block diagram illustrating components of a wireline and wireless communications network and illustrating interaction between a voice services node and a customer profile database and subscriber address book. As described in further detail below, according to embodiments of the present invention, a telecommunications services subscriber desiring directory assistance for a party to whom the subscriber wishes to place a call accesses a voice services node 56 from her telephone 21 or 24 via a public switched telephone network 31. Alternatively, the subscriber accesses the voice services node 56 via a wireless device 53, 58, 59 via a wireless network 51. After receiving a voice prompt from the voice services node, the subscriber speaks the name and/or address of the party with whom the subscriber requests connection. The voice services node 56 queries an address book 75 to determine whether the subscriber has an address book, and if so, whether a directory number for the called party has been previously stored to the subscriber's address book. If the subscriber has an address book at the address book 75, and if the requested directory number is in the address book, the requested directory number may be returned to the subscriber, and if desired, the voice services node may automatically facilitate a connection between the subscriber and the called party via the obtained directory number.

If the obtained directory number is not located in an address book for the subscriber, the voice services node 56 connects the subscriber to a directory assistance service 80 that is either operated by the telecommunications service provider operating the voice services node or by a third party. Once the voice services node 56 obtains the requested number from directory assistance, the voice services node queries a customer profile database to determine whether a customer profile has been established for the subscriber. If so, a prompt is provided to the subscriber from the voice services node to determine whether the subscriber desires to add the obtained directory number to the subscriber's address book. If the subscriber desires to add the obtained directory number to her address book, the number is added to the subscriber's address book along with identifying information such as the name and/or address of the party associated with the obtained directory number. If the subscriber does not have an established address book, a prompt from the voice services node 56 may be played to the subscriber providing the subscriber options for establishing an address book 75. Likewise, if the subscriber does not have a customer profile in the customer profile database 70, a prompt may be provided to the subscriber from the voice services node 56 providing the subscriber options for establishing a customer profile in the customer profile database 70.

Once an obtained directory number is saved to the subscriber's address book 75, future requests for the obtained directory number may be processed by the voice services node 56 by extracting the obtained number directly from the address book 75. Accordingly, the obtained directory number is retrieved by the voice services node 56 in a more efficient and cost effective manner where queries to a local or third party directory assistance service are avoided for future requests for the obtained directory number.

Operating Environment

Figure 2:
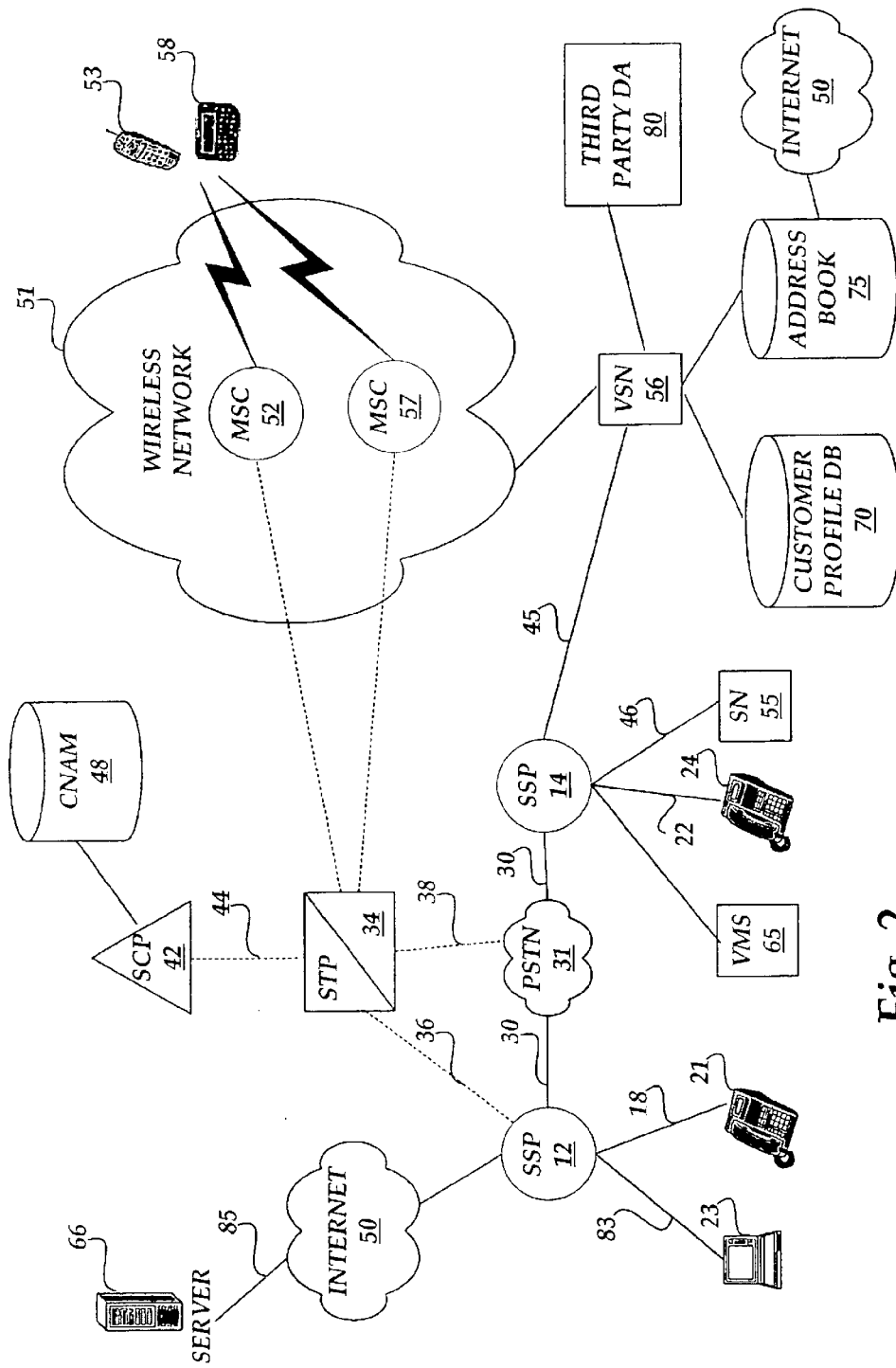
FIG. 2 is a simplified block diagram illustrating components of a wireline and wireless communications network that provides an exemplary operating environment for the present invention.

FIG. 2 is a simplified block diagram illustrating components of a wireline and wireless communications network that provides an exemplary operating environment for the present invention. FIG. 2 and the following description is intended to provide a brief, general description of a suitable operating environment in which the embodiments of the invention may be implemented. While the invention may be described in the general context of software program modules that execute in conjunction with an application program that runs on an operating system of a computer, those skilled in the art will recognize that the invention may also be implemented in a combination of other program modules. Generally, program modules include routines, programs, components, data structures and other types of structures that perform particular tasks or implement particular abstract data types. Moreover, those skilled in the art will appreciate that the invention may be practiced with other telecommunication system and computer system configurations, including hand-held devices, multi-processor systems, multi-processor based or programmable consumer electronics, mini computers, mainframe computers, and the like. The invention may also be practiced in a distributed computing environment where tasks are performed by remote processing devices that are linked through a communications network. In a distributed computing environment, program modules may be located in both local and remote memory sources devices.

The public switched telephone network 31 that evolved in the 1980s incorporated the advanced intelligent network (AIN). Some of the components of the advanced intelligent network are illustrated in FIG. 2. FIG. 2 is illustrative of at least a part of the advanced intelligent network (AIN) 100 of a typical local exchange carrier integrated with components of a wireless network 51. The advanced intelligent network (AIN) uses the signaling system 7 (SS7) network for signal or system control message transport. The components thereof are well known to those skilled in the art. The operation of many of the components of the advanced intelligent network is also described in U.S. Pat. No. 5,245,719 to Weisser entitled "Mediation of Open Advanced Intelligent Network Interface by Shared Execution Environment" which is incorporated herein by reference. The SS7 communications protocol is provided in the document entitled "Bell Communications Research Specification of Signaling System 7," Document TR-NWT-000246, Issue 2 (June 1991), plus Revision 1 (December 1991), which is also incorporated herein by reference.

A plurality of central offices is provided in a typical public switched telephone network. As shown in FIG. 2, each central office may include an electronic switch known to those skilled in the art as a service switching point (SSP). These are indicated in FIG. 2 as SSP switches 12 and 14. The number of SSP switches depends on the number of subscribers to be served by the public switched telephone network. An SSP is the AIN component of a typical electronic central office switch used by a local exchange carrier. The terms "SSP" and "switch" are used interchangeably hereinafter and are understood to refer to a telecommunications switch having AIN capability and which may be utilized for connecting voice channel circuits, including voice channel lines, such as trunk circuits 30.

As shown in FIG. 2, switches (SSP) 12 and 14 have a plurality of subscriber lines 18 and 22 connected thereto. Each of the subscriber lines 18 and 22 is connected to a terminating piece or pieces of customer premises equipment that are represented by telephones 21 and 24. A computer 23 also is illustrated as connected to the switch 12 via the subscriber line or CTI 83. The computer 23 is illustrative of a single or a plurality of computing and data storage devices. SSP switches 12 and 14 are connected by a plurality of trunk circuits 30. These are the voice path trunks that interconnect the central offices 12 and 14 and over which calls are connected when completed.

Each piece of terminating equipment in the PSTN 31 is preferably assigned a directory number. The term "directory number" is used herein in a manner consistent with its generally understood meaning of a number that is dialed or input by an originating party at an originating station to reach a terminating station associated with the directory number. A directory number, typically a ten digit number, is commonly referred to as a "telephone number" and may be assigned to a specific telephone line, such as the telephone line 18 shown in FIG. 1.

Much of the intelligence, and the basis for many of the enhanced features of the network, resides in the local service control point (SCP) 42 that is connected to signal transfer point 34 via SS7 data link 44. As is known to those skilled in the art, service control points, such as the SCP 42, are physically implemented by relatively powerful fault tolerant computers. Among the functions performed by the service control points is maintenance of network databases used in providing enhanced services. Service control points, such as SCP 42, normally implement high volume routing services, such as call forwarding and 800 number translation and routing. They are also used for maintenance of and providing access to high volume databases for authorization of billing, such as credit card number validations. In most local exchange carrier networks, service control points are only used for data base look up and routing services that take place prior to the logical completion of the call, i.e., the provision of a ringing signal to the called subscriber line and ring back to the calling subscriber.

Additional devices for implementing advanced network functions within the AIN are provided by regional STPs (not shown) and regional SCPs (not shown). The STP 34 is connected to the SSPs via connections 36 and 38. Both the regional SCPs and the local SCP 42, which represent a plurality of local SCPs distributed throughout the AIN, are connected via respective data links to the service management system (not shown). 46 service management systems provide a centralized platform for remotely programming the various SCPs of the AIN so that a coordinated information processing scheme may be implemented for the AIN.

The modern Advanced Intelligent Network also includes service nodes (SN) 55. Those skilled in the art are familiar with service nodes, which are physically implemented by the same types of computers that embody the SCP 42. In addition to the computing capability and data base maintenance features, service nodes 55 use ISDN lines and may include DTMF signal recognition devices, tone generation devices, text to speech (TTS) voice synthesis devices and other voice or data resources. As shown in FIG. 1, the connection is through the SSP. For example, SN 55 is connected to SCP 42 via ISDN links 46 to SSP 14, ISDN/SS7 protocol conversion in SSP 14, and SS7 links 38 and 44. According to a preferred embodiment, the ISDN links 46 serve as a primary rate interface (PRI) over which services may be provided to subscribers using wireline services such as the wireline telephone sets 21 and 24 and subscribers using wireless services such as the wireless units 53, 58.

The voice services node (VSN) 56 performs the same functions as the service node 55, but also includes voice/speech recognition capability for receiving, processing and handling incoming calls based on speech-based information, commands and instructions provided by callers. Voice/speech recognition utilizes speech enabled telephony. In "speech enabled" telephony systems callers may talk, not dial. For example, according to a voice activated dialing system, a caller may speak the words "Call Joe." According to embodiments of the present invention described below, the VSN 56 places a call to the desired called party. Speech enabled telephony makes use of speech recognition and text-to-speech conversion in order to talk to callers. VSNs 56 may find phone numbers, dial them, read a caller her voice and email messages, allow the caller to respond and then send a caller a message over the Internet or over her corporate intranet. Speech enabled telephony allows a subscriber to call the VSN 56 to obtain (hear) information specific for the subscriber.

Voice recognition via the VSN 56 also includes the ability of a machine to recognize a subscriber's voice. Voice recognition includes the ability of a machine to understand human speech particular to a subscriber. Isolated word and phrase recognition is used in which a VSN 56 is trained to recognize a discrete set of command words or phrases and to respond appropriately. Connected word recognition is used in which a VSN 56 is trained on a discrete set of vocabulary words (for example, digits), but is required to recognize fluent sequences of these words such as credit card numbers. Continuous speech recognition is used in which a VSN 56 is trained on a discrete set of subword vocabulary units (e.g., phonemes), but is required to recognize fluent speech.

A speech recognition system usually is made up of an input device, a voice board that provides analog-to-digital conversion of the speech signal, and a signal processing module that takes digitized speech samples and converts them into a series of patterns. These patterns are then compared to a set of stored models that have been constructed from the knowledge of acoustics, language, and dictionaries. The technology may be speaker dependent (trained), speaker adaptive (improves with use), or fully speaker independent. In addition features such as barge-in capability, which allows the user to speak at anytime, and key word spotting, which makes it possible to pick out key words from among a sentence of extraneous words, enable the development of more advanced applications.

According to embodiments of the present invention, the VSN 56 also includes general computing functionality including a computer processor and associated memory for running one or more software applications or software modules described herein and for storing associated data. According to embodiments of the present invention, the VSN 56 is operative to send database queries to the customer profile database 70 and to the address book database 75 via well known data transmission protocols, including TCP/IP. The VSN 56 may receive and process return data from those databases. Additionally, as with the SN 55, the VSN 56 may route calls within the telecommunications network in which the VSN 56 resides, as well as, send and receive calls. The VSN 56 is further operative to send and receive data through a distributed computing network, such as the Internet 50, to a variety of remote data storage mediums and local and remote information resource providers such as may be available at the server 66.

The customer profile data base 70 is a general purpose database. As known to those skilled in the art, a database may be composed of records, each containing fields together with a set of operations for searching, sorting, recombining, and other functions. The customer profile database may include a variety of information for each subscriber such as a subscriber's telephone directory numbers, including business, wireless and personal numbers. The customer profile database 70 may include the subscriber's electronic mail address and a list of services subscribed to by the subscriber such as call forwarding, call waiting and voice mail, etc. The customer profile database may include other personal information such as directions to always forward calls to the subscriber at a specific number on certain days or times. Marketing and advertising information may also be included in a customer profile to be provided to callers to the subscriber.

The address book database 75 is another database that contains information on parties saved at the direction of or for the benefit of a subscriber. For example, in accordance with the present invention, a directory number obtained from directory assistance by a subscriber may then be saved in the subscriber's address book so that the subscriber does not need to use directory assistance the next time the subscriber needs that number. Other information such as a party's physical address, electronic mail address and other helpful information on the party may be saved in the address book database 75.

The directory assistance service 80 is illustrative of any local directory assistance service (provided by the subscriber's telecommunications service provider or third party or of a third party directory assistance service that may be accessed from a number telecommunications networks for obtaining a directory number for a desired called party. Some directory assistance services provide addresses for desired called parties upon request. Directory assistance services are well known to those skilled in the art.

The voice mail system 65 is shown in FIG. 1 being functionally connected to the switch 14 and is a component of the network 100. That is, calls are routed to and from the voice mail system 65 at the control and direction of the network 100 via such components as the SCP 42. The voice mail system 65 typically includes a computer or collection of computers, recording and recording playback devices, and software for recording announcements for incoming calls, recording and playing back recorded messages, and for receiving incoming calls and for making outgoing calls at the direction of the network 100. The voice mail system 65 has memory capacity for saving announcements to incoming callers and for saving messages from incoming callers. The computing system of the voicemail system 65 may send and receive electronic mail via the network 100 and the Internet 70.

A computer telephony interface 83 serves as an interface between the telephone 21 and the computer 23. Computer telephone integration, as facilitated by the computer telephony interface (CTI) 83, is a process for integration of a telephone system with a computing system. For example, the CTI 83 may be used for allowing computer applications to answer incoming calls, provide database information on a computer screen at the same time the call comes in, automatically route and reroute calls, automatically dial and speed dial outgoing calls from a computer resident database and identify incoming customer calls and transfer them to predetermined destinations based on calling party identification received on the incoming telephone call. The computer telephony interface 83 may be a software application program resident on the telephone 21.

The Internet 50 is well known to those skilled in the art as essentially a packet-switched network based on the family of protocols called Transmission Control Protocol/Internet Protocol (TCP/IP), a family of networking protocols providing communication across interconnected networks between computers with diverse hardware architectures and between various computer operating systems. Operation of the Internet 50 and the TCP/IP transmission protocols is well known to those skilled in the art.

The server 66 is a computer or collection of computers and associated memory storage. On the Internet 50 or other network, the server 66 may include a computer or software application that responds to commands from a client computer, for example the VSN 56 according to the present invention. A file server may contain an archive of data or program files. When a client computer submits a request for a file to the file server, the file server transfers a copy of the file to the client computer.

In operation, the intelligent network elements of the AIN, as described above, communicate with each other via digital data messages transmitted over the network of digital data links. An SSP may be configured to interface with these network elements through the use of a trigger. A trigger in the network is an event associated with a particular subscriber line or call that causes the SSP to generate a data packet message to be sent to a service control point. In order to keep the processing of data and calls as simple and generic as possible at central office switches, such as SSP switches 12 and 14, a relatively small set of triggers are defined at the SSP switches for each call.

The message created by an SSP in response to the "firing" of a trigger is known as a "query" message. A query message opens a "transaction" and the SSP generally holds the communication until it receives a reply from an appropriate network element via the network of digital data links instructing the SSP 12 to take a certain action. If the SSP 12 receives no instructions within a certain amount of time, the SSP "times-out" and executes a default task for the communication. The reply to the query message may be a "conversation" message or a "response" message. Conversation messages allow for bi-directional exchanges between network elements while the transaction remains open. A "response" message closes the transaction opened by the query message, and usually instructs the SSP to route the held communication for connection with a terminating station. Query messages, conversation messages, and response messages are standard types of messages defined by the AIN protocol. The details of the AIN protocol are well known to those skilled in the art and will not be further described herein. For more information regarding the AIN protocol, see Bellcore Specification GR-1298-CORE Switching Systems Generic Requirements for AIN 0.1, which is incorporated herein by reference.

The wireless network 51, such as a cellular network, comprises a mobile switching center (MSC) 52, 57. The MSC 52 is a switch providing services and coordination between wireless users in the network 51 and external networks. The MSC 52 may be connected to the STP 34 to provide information to the wireline network and receive information from the wireline network. The MSC 52 also communicates with a wireless subscriber, such as wireless telephones 53.

Operation

Figure 3:
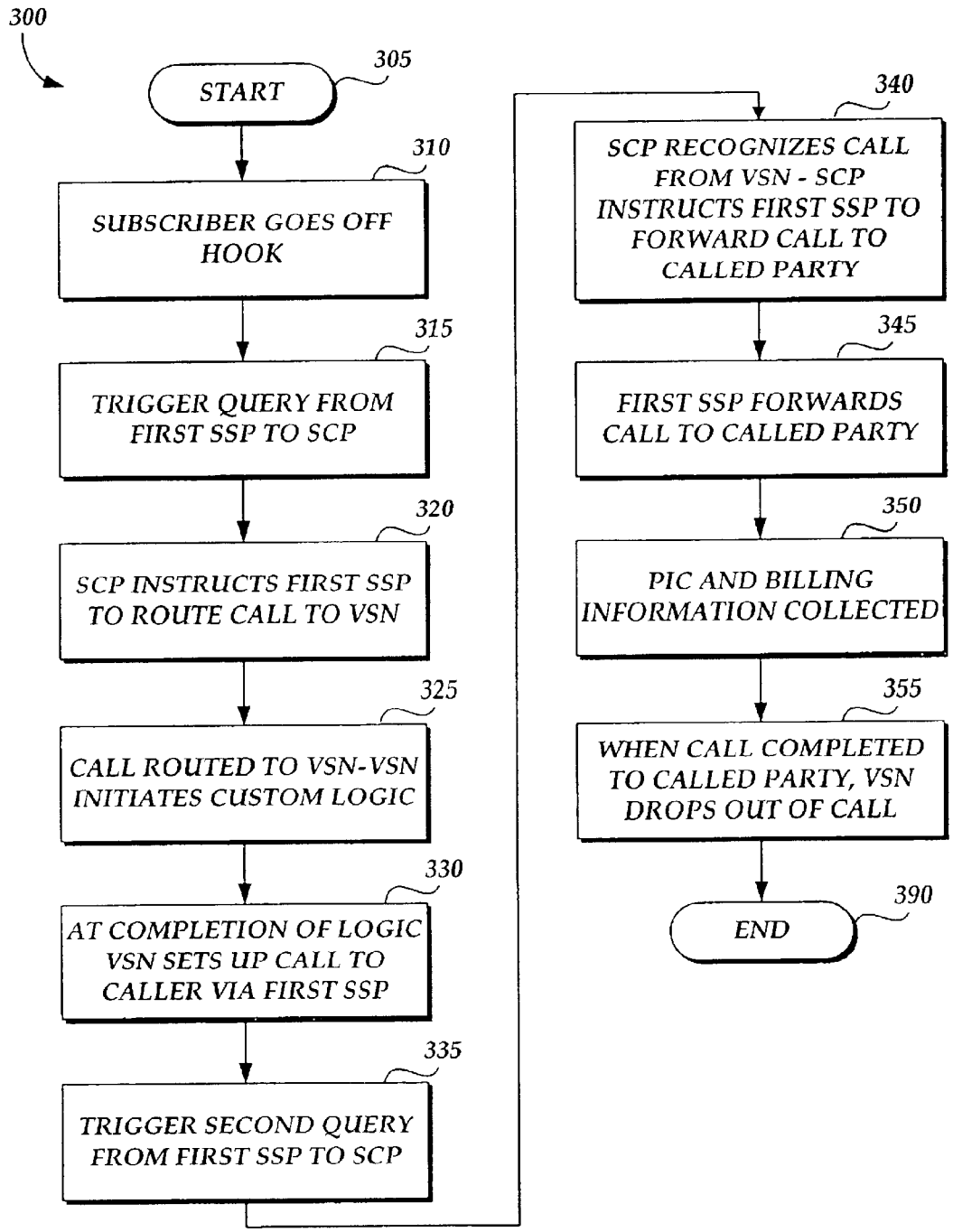
FIG. 3 illustrates a logical call flow of steps performed by a method and system of the present invention for utilization of a voice services node in general call processing.

FIG. 3 illustrates a logical call flow of steps performed by a method and system of the present invention for utilization of a voice services node 56 in general call processing. According to embodiments of the present invention, the voice services node 56 is utilized to facilitate voice interaction between a subscriber and components of the subscriber's telecommunications network and for providing other processing including database lookup and general call processing. For purposes of description, and by way of example only, FIG. 3 is described with reference to call processing steps associated with a voice activated dialing system where a subscriber may connect to a voice services node 56, speak the name of a desired called party and receive assistance from the voice services node 56 in locating a directory number associated with the desired called party and for processing a call between the subscriber and the called party. As should be understood by those skilled in the art, a number of other services may be provided by interaction between a subscriber and the voice services node 56, as described herein with reference to embodiments of the present invention.

Referring then to FIG. 3, the method 300 begins at start step 305 and proceeds to step 310 where a subscriber initiates contact with a voice services node 56 to obtain the services of the voice services node 56 in assisting the subscriber with some type of call processing, for example voice activated dialing, or some other telecommunications service available to the subscriber, for example directory assistance services. At step 310, the subscriber may initiate contact with the voice services node in a variety of manners. According to one embodiment, an off-hook delay trigger may be provisioned at the subscriber's SSP 12 so that when the subscriber takes her telephone set 21 into an off-hook configuration, the off-hook delay trigger provisioned at the SSP 12 triggers (fires) a query for initiating an interactive session with the voice services node 56. Alternatively, at step 310, the subscriber may dial using her telephone 21 a specialized dialing code associated with the desired service. For example, if voice activated dialing is desired by the subscriber, the subscriber may dial a service code, for example "*11," that will be received by the subscriber's SSP 12 which will in turn cause a query to be triggered (fired) from the SSP 12 to initiate an interactive voice session with the voice services node 56.

At step 315, a trigger provisioned at the subscriber's SSP 12 is fired causing a query to the service control point 42 for routing and processing instructions associated with the call. At step 320, the service control point 42 recognizes the query as being associated with the requested service, for example voice activated dialing service, and the service control point 42 instructs the subscriber's SSP 12 to route the call from the subscriber to the voice services node 56. At step 325, the call is received by the voice services node 56, and the voice services node 56 initiates custom logic associated with the requested service. For example, if the requested service is voice activated dialing, the voice services node 56 may provide an audio prompt to the caller such as "Who would you like to call?" Following with the present example, the subscriber (calling party) may respond with a name such as "John Doe," and the voice services node 56 converts the responsive name provided by the subscriber to a digital file using a speech recognition software module resident at the voice services node 56.

The name provided by the subscriber, "John Doe," is used by the voice services node 56 to parse an address book 75 associated with the subscriber or calling party to determine whether a directory number has been stored for the requested name. The voice services node 56 may utilize a calling line identification number associated with the telephone line from which the subscriber has called for matching the subscriber to the subscriber's personal address book 75. Alternatively, the subscriber may be required by the voice services node 56 to enter or speak a user ID and personal identification number.

If the voice services node 56 obtains a directory number associated with the requested name, call processing continues to step 330. Once processing by the voice services node according to the calling feature, for example voice activated dialing, is completed by the voice services node 56, the method continues to step 330, and the voice services node sets up a call to the subscriber via the subscriber's SSP switch 12. According to the example described herein, the voice services node 56 sets up a call ultimately between the subscriber (calling party) and the desired called party via the directory number obtained for the desired called party name.

At step 335, a trigger provisioned at the caller's switch 12 is fired by the call from the voice services node 56 back to the subscriber at the subscriber's switch 12. According to one embodiment of the present invention, the trigger provisioned at the switch 12 is a termination attempt (TAT) trigger. At step 335, the trigger fired at the SSP 12 by the call from the voice services node 56 launches a second query to the service control point 42. At step 340, the service control point 42 recognizes the call from the voice services node 56, and the service control point 42 instructs the SSP 12 to forward the call from the voice services node 56 to the called party using the directory number obtained for the called party by the voice services node 56. At step 345, the SSP 12 forwards the call from the voice services node 56 to the called party at the called party's telephone 24 through the called party's switch 14 via the public switched telephone network 31. As should be understood by those skilled in the art, at this point, a three-way communication is established between the subscriber, the voice services node 56 and the called party. At step 350, billing information, associated with the call may be collected. At step 355, when the call is completed between the subscriber and the called party, the voice services node 56 drops itself from the call leaving the subscriber in communication with the called party.

Accordingly, the voice services node 56 facilitates a voice activated dialing session where the subscriber is required to only speak the name of the party to whom she would like to be connected, and the voice services node 56 facilitates the connection by setting up a call between the subscriber and the desired called party followed by the voice services node 56 dropping itself from the call. The method ends at step 390. As should be understood, the foregoing description of FIG. 3 is described with reference to a voice activated dialing service by way of example only to illustrate the interaction between a subscriber and the voice services node 56 and to illustrate some of the capabilities of the voice services node 56 for causing call routing and to facilitate specialized services required by the subscriber.

Additional specialized features and call processing functionality provided via interaction between a subscriber and a voice services node 56 is described below with reference to FIG. 4. For further description of methods and systems for accessing and obtaining functionality from a voice services nodes 56, see U.S. patent application Ser. No. 10/029,549, filed Dec. 21, 2001, entitled "Method and System of Call Orientation Using a Service Circuit Node in an Advanced Intelligent Network" and U.S. patent application Ser. No. 10/033,627, filed Dec. 27, 2001, entitled "Method and System of Voice Activated Dialing Using an Intelligent Peripheral in Advanced Intelligent Network" both applications of which are incorporated herein by reference as if fully set out herein. Additionally, routing of calls from a subscriber or calling party to and from a voice services node 56, as described above with reference to FIG. 3 may be performed according to standard advanced intelligent network procedures and protocols which are well known to those skilled in the art.

Figure 4:
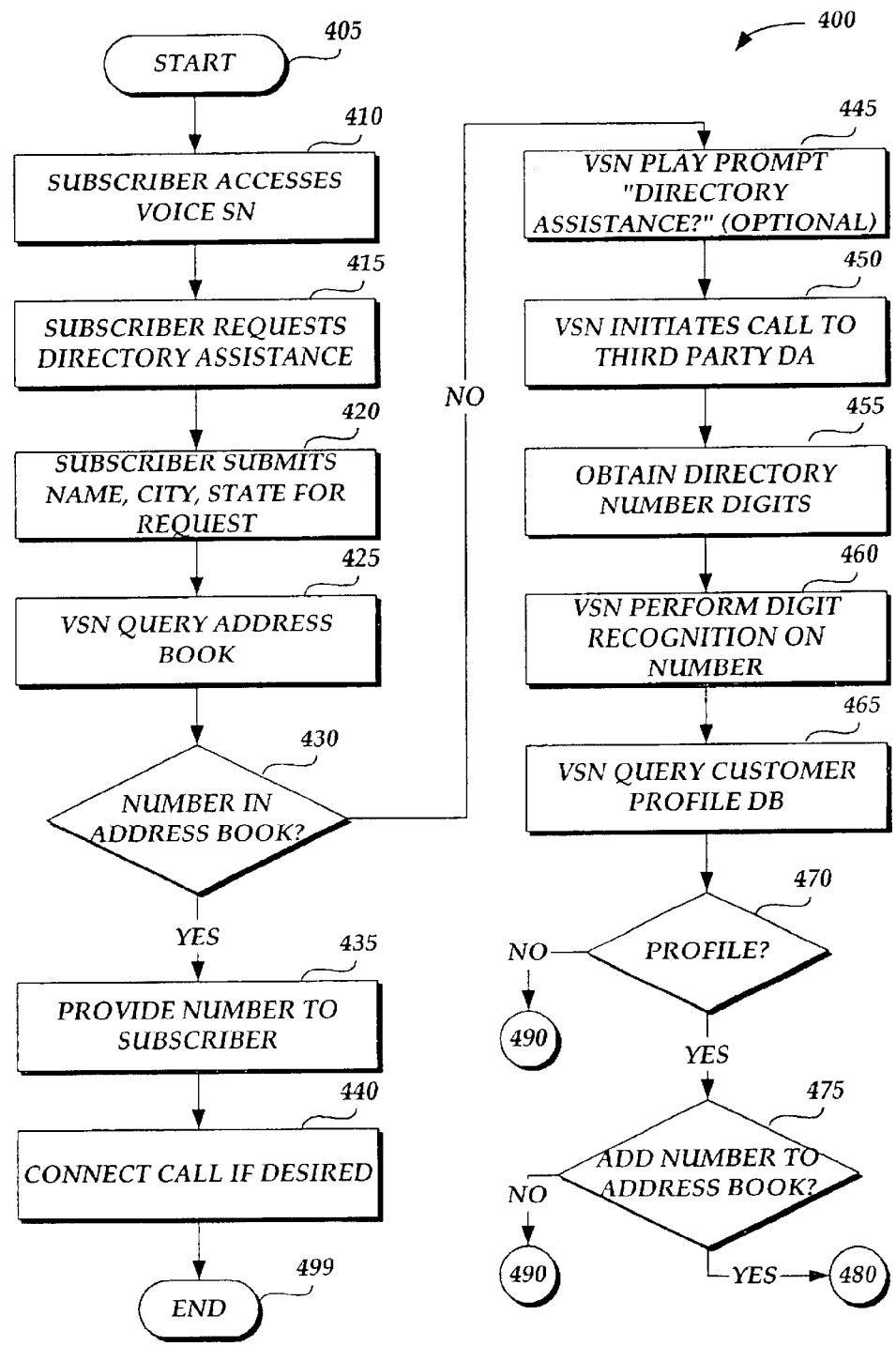
FIGS. 4 and 5 illustrate a logical call flow of the steps performed by a method and system of the present invention for obtaining and storing directory assistance services data to a subscriber address book.
Figure 5:
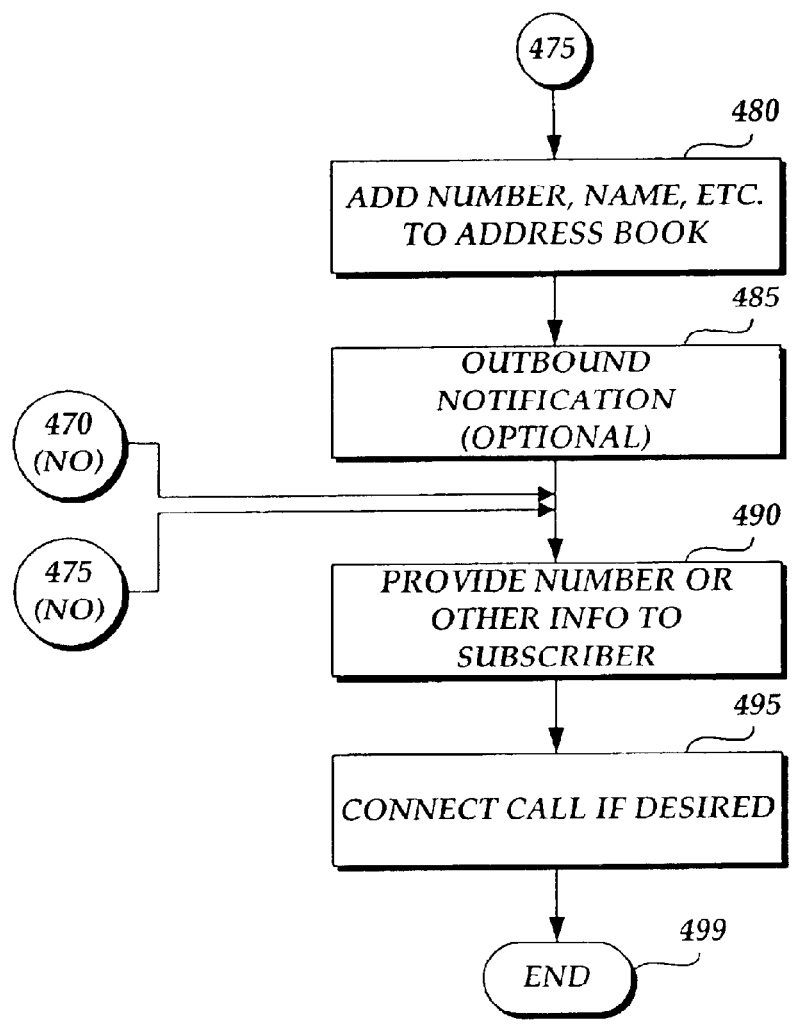

FIGS. 4 and 5 illustrate a logical call flow of the steps performed by methods and systems of the present invention for obtaining and storing directory assistance services data in a subscriber address book. The following descriptions of FIGS. 4 and 5 are made with reference to FIGS. 1, 2 and 3 above. The method 400 begins at start step 405 and proceeds to step 410 where the subscriber accesses the voice services node 56 from the subscriber's telephone 21 as described above with reference to FIG. 3. According to the call flow illustrated in FIGS. 4 and 5, the subscriber desires connection to a called party in association with a voice activated dialing system, as described above with reference to FIG. 3. As described below, the call flow described with reference to FIGS. 4 and 5 may be utilized for voice activated dialing where the subscriber requests the dialing of a particular name and where the voice services node 56 connects the subscriber to a local or third party directory assistance service 80 if a directory number associated with the desired called party is not located in a subscriber address book 75. Alternatively, the call flow illustrated in FIGS. 4 and 5 may be utilized where the subscriber is primarily interested in directory assistance services as opposed to voice activated dialing. If the subscriber is interested in voice activated dialing, the subscriber may be connected the voice services node 56 by an off-hook delay trigger or by the dialing of a voice activated dialing entry code. Alternatively, if the subscriber is interested in going directly to a directory assistance service where the subscriber knows that the desired directory assistance number is not in the subscriber's address book 75, the subscriber may access the voice services node 56 by an off-hook delay trigger associated with directory assistance services or by the entry of a directory assistance entry code such as "*411." It should be understood by those skilled in the art, the subscriber may place a call to the voice services node 56 for obtaining the functionality of the present invention from the subscriber's wireless telephone 53 or wireless device 58 over the wireless network 51 to the voice services node 56.

At step 415, the voice services node 56 may prompt the subscriber to receive the subscriber's request. For example, the voice services node 56 may provide a prompt such as "How can I help you?" to which the subscriber may respond "directory assistance please." Alternatively, if the subscriber has accessed the voice services node 56 for voice activated dialing services, the voice services node 56 may provide a prompt such as "Who would you like to call?" Accordingly, the subscriber may respond with a name such as "John Doe," as described above with reference to FIG. 3. At step 420, the name and address, if required, are received from the subscriber by the voice services node 56. The speech recognition module at the voice services node 56 converts the spoken name and/or address provided by the subscriber to a digital file such as a WAV file that may be used to parse the subscriber's address book 75 to determine whether the name and associated directory number are stored in the subscriber's address book 75.

At step 425, the voice services node 56 queries the address book 75 for an address book memory location associated with the subscriber. According to one embodiment, the voice services node 56 may query the address book 75 using the calling line identification (CLID) associated with the telephone line from which the subscriber's call to the voice services node 56 is placed. Alternatively, the voice services node 56 may prompt the subscriber for a user identification and/or personal identification number to authenticate the subscriber and to query the address book 75 for the subscriber's personal address book.

At step 430, a determination is made as to whether the address book database 75 contains a personal address book location for the subscriber. If the subscriber has an address book at the address book database 75, a database query is presented to the address book of the subscriber to determine whether the name and/or address provided by the subscriber has been stored along with an associated directory number. If the address book 75 contains a memory location for the subscriber, and if a directory number is obtained by the voice services node associated with the name and/or address provided by the subscriber, the directory number is returned to the voice services node 56. At step 435, the voice services node 56 may play the directory number to the subscriber, if desired, or the method may proceed to step 440 and the voice services node may automatically connect the subscriber to the called party, as described above with reference to FIG. 3.

Returning back to step 430, if the address book DB 75 contains no address book memory location for the subscriber, or if the subscriber has an address book memory location, but the desired number is not located in the address book by the voice services node 56, the method proceeds to step 435 where the voice services node 56 initiates a connection between the subscriber and a local or third party directory assistance service platform 80. As described below, the VSN 56 may query the customer profile DB 70 for a profile for the subscriber (calling party) to determine whether the subscriber has a personal address book in the address book DB 75. Prior to connecting the subscriber to the directory assistance platform 80, the voice services node 56 may provide a prompt to the subscriber asking the subscriber if he/she would like to register with the telecommunications service provider to create an address book memory location at the address book DB 75 for future use.

If the subscriber has established an address book for maintaining address data for the subscriber, the voice services node 56 may provide a prompt to the subscriber such as "Your address book contains no directory number for the desired calling party, would you like to be connected to directory assistance?" If the subscriber wishes to be connected to directory assistance services, the method proceeds to step 450 and the voice services node initiates a call to the local or third party directory assistance services platform 80. Alternatively, when the voice services node 56 determines that no address book is available for the subscriber or that a directory number associated with the desired called party is not available in the subscriber's address book, the voice services node 56 may automatically connect the subscriber to the directory assistance services platform 80 to obtain directory assistance services for the subscriber.

At step 450, the voice services node 56 initiates a call between the subscriber and the directory assistance services platform 80 just as would be done if the subscriber had directly called the directory assistance services. In order to connect the call between the subscriber and the directory assistance services platform 80, the voice services node bridges a call between the subscriber and directory assistance in the same manner as the voice services node connected a call between the subscriber and the called party as described above with reference to FIG. 3. According to an embodiment of the present invention, however, the voice services node 56 remains connected in the call between the subscriber and the directory assistance services platform 80. When the subscriber hears a prompt from the directory assistance service such as "Name, city and state please," the voice services node 56 records the subscriber's response. That is, if the subscriber responds "John Doe, Atlanta, Ga.," the voice services node 56 records that information and the speech recognition module of the voice services node 56 converts that information to a digital file, such as a WAV file, for subsequent use. At step 455, when the directory assistance services platform 80 responds to the subscriber's request with a directory number associated with the requested called party, the voice services node captures the digits provided by the directory assistance service and converts those digits to a digital file.

At step 460, the voice services node performs digit recognition on the number provided by the directory assistance services platform 80 to determine whether an appropriate directory number has been received for subsequent use. At step 465, the voice services node 56 queries the customer profile database 70 to determine whether the subscriber has a customer profile established in a customer profile database 70 containing services information subscribed to by the subscriber. If not, the method proceeds to step 490 for call processing, as described below. If the subscriber has customer profile information indicating the presence of an address book memory location for the subscriber in the address book 75.

As should be understood by those skilled in the art, if it was determined at step 430 that the subscriber did not have an address book 75, the subscriber may have followed a prompt from the voice services node 56 to establish an address book memory location at the address book DB 75 at which time customer profile data would be obtained for the subscriber and populated in the customer profile database 70 along with the establishment of an address book memory location associated with the subscriber in the address book 75. If it was established at step 430 that the subscriber has an address book memory location at the address book 75, the method may proceed directly from step 465 to step 475. Alternatively, if it is determined at step 470 that the subscriber now has an address book memory location at the address book 75, the method proceeds to step 475.

At step 475, the voice services node 56 may prompt the subscriber to determine whether the subscriber would like to add the obtained directory number recorded by the voice services node 56 from the directory assistance service platform 80 into the subscriber's address book 75. According to one embodiment of the present invention, the voice services node 56 may read back the information to the subscriber, for example "John Doe, 404-555-1212," followed by a prompt such as "Would you like to add this directory number to your address book for future use?" If the subscriber does not wish to add the number to his/her address book 75, the method proceeds to step 490 for call processing as described below. If the subscriber desires to add the newly obtained directory number to the subscriber's address book 75, the method proceeds to step 480, FIG. 5, and the voice services node 56 populates the subscriber's address book 75 with the obtained name and associated directory number information.

At step 485, according to an alternate embodiment of the present invention, an outbound notification may be forwarded to the called party by the voice services node 56 to notify the called party that the directory number of the called party has been obtained by the subscriber and has been added to the subscriber's personal address book. The outbound notification is performed by the voice services node 56 by placing a call to a previously selected telephone directory number of the called party to notify the called party, as described. For a further description of outbound notification, see U.S. patent application Ser. No. 10/393,130, filed Mar 20, 2003, entitled "Outbound Notification Using Customer Profile Information," assigned to the same assignee as the present invention, which is incorporated herein by reference as if fully set out herein.

After the obtained directory number has been added to the subscriber's address book 75, or if the subscriber does not wish to add the directory number to his/her address book 75, or if the subscriber has no address book 75, the method proceeds to step 490 and the obtained directory number may be provided to the subscriber. If the subscriber does not wish to have the call connected automatically, the method may end at this point, and the subscriber may place a call to the called party using the obtained directory number. On the other hand, if it is desired by the subscriber that the call be automatically connected by the voice services node 56, the method proceeds to step 495, and the voice services node 56 connects the subscriber to the called party using the obtained directory number, as described above with reference to FIG. 3.

Accordingly, as described above, the subscriber may request voice activated dialing services or directory assistance services via the voice services node 56. If the voice services node 56 locates the required directory number in a subscriber address book 75, the subscriber may be automatically connected to the desired called party. However, if the desired directory number is not located by the voice services node 56 in a subscriber address book 75, the voice services node 56 may automatically bridge the subscriber to a directory assistance service services platform to obtain the desired directory number. Once the desired directory number is obtained, the voice services node 56 may update the subscriber's address book 75 and direct the subscriber to the desired called party as would be done by the voice services node 56 in a voice activated dialing procedure.

It will be apparent to those skilled in the art that various modifications and variations may be made in the present invention without departing from the scope or spirit of the invention. Other embodiments of the invention will be apparent to those skilled in the art from consideration of the specification and practice of the invention disclosed herein.

We claim:

1. A method for obtaining directory assistance information and for storing the obtained directory assistance information in a subscriber address book, comprising:

placing a call at a calling party switch for voice interactive services;

routing the call to a network component for voice interactive services;

receiving a request at the network component to connect the call to a called party;

querying a calling party address book for a directory number associated with the called party;

if the directory number associated with the called party is located in the calling party address book, returning the directory number to the network component;

if the directory number associated with the called party is not located in the calling party address book, connecting the calling party to a directory assistance services for obtaining a directory number for the called party; and prior to the step of routing the call to a network component for voice interactive services, triggering a query from the calling party switch to a service control point for call routing instructions.

2. The method of claim 1, after the step of triggering a query from the calling party switch to a service control point for call routing instructions, further comprising determining at the service control point that the call requires voice interactive services.

3. The method of claim 2, whereby the step of determining at the service control point that the call requires voice activated services includes determining at the service control point that the call requires voice activated dialing services.

4. A method for obtaining directory assistance information and for storing the obtained directory assistance information in a subscriber address book, comprising:

placing a call at a calling party switch for voice interactive services, including entering a dialing code at the calling party switch associated with voice interactive services;

routing the call to a network component for voice interactive services;

receiving a request at the network component to connect the call to a called party;

querying a calling party address book for a directory number associated with the called party;

if the directory number associated with the called party is located in the calling party address book, returning the directory number to the network component;

if the directory number associated with the called party is not located in the calling party address book, connecting the calling party to a directory assistance services for obtaining a directory number for the called party; and whereby receiving the dialing code at the calling party switch causes triggering a query to a service control point.

5. The method of claim 4, further comprising, prior to the step of triggering a query from the calling party switch to a service control point for call routing services, provisioning an off-hook delay trigger at the calling party switch associated with voice interactive services.

6. The method of claim 5, whereby the step of provisioning an off-hook delay trigger at the calling party switch associated with voice interactive services included provisioning an off-hook delay trigger at the calling party switch associated with voice activated dialing services.

7. The method of claim 5, whereby the step of triggering a query from the calling party switch to a service control point for call routing services includes firing the off-hook delay trigger at the calling party switch in response to receiving the call at the calling party switch.

8. A method for obtaining directory assistance information and for storing the obtained directory assistance information in a subscriber address book, comprising:

placing a call at a calling party switch for voice interactive services;

routing the call to a network component for voice interactive services;

receiving a request at the network component to connect the call to a called party querying a calling party address book for a directory number associated with the called party;

if the directory number associated with the called party is located in the calling party address book, returning the directory number to the network component;

if the directory number associated with the called party is not located in the calling party address book, connecting the calling party to a directory assistance services for obtaining a directory number for the called party; and after the step of connecting the calling party to a directory assistance service, requesting by the directory assistance service from the calling party the name and address of the called party;

recording by the network component the name and address provided by the calling party to the directory assistance service;

recording by the network component a directory number for the called party provided by the directory assistance service to the calling party; and at the network component, performing a digit recognition on the directory number for the called party provided by the directory assistance service to determine whether the directory number provided by the directory assistance service is a valid directory number.

9. The method of claim 8, further comprising converting the name an address provided by the calling party from an audio format to a digital format; and converting the recorded directory number for the called party provided by the directory assistance service to the calling party from an audio format to a digital format; and storing the name of the called party provided by the calling party and the directory number for the called party provided by the directory assistance service in the calling party address book database for subsequent use.

10. The method of claim 9, prior to storing the name of the called party provided by the calling party and the directory number for the called party provided by the directory assistance service in the calling party address book database, prompting the calling party from the network component to determine whether the calling party desires that the directory number for the called party provided by the directory assistance service be stored in the calling party address book database for subsequent use.

11. The method of claim 9, after storing the name of the called party provided by the calling party and the directory number for the called party provided by the directory assistance service in the calling party address book database, connecting the calling party to the called party via the directory number provided for the called party by the directory assistance service.

12. The method of claim 11 further comprising;
connecting the calling party to the called party includes passing from the network component the directory number for the called party provided by the directory assistance service to the service control point for call routing instructions;
at the service control point instructing the calling party switch to route the call from the calling party to the called party via the directory number provided for the called party by the directory assistance service; and
receiving instructions at the calling party switch from the service control point to forward the call from the calling party to the called party via the directory number for the called party provided by the directory assistance service and passed to the service control point from the network component.

13. A system for obtaining directory assistance information and for storing the obtained directory assistance information in a subscriber address book, comprising:
a voice interactive services node operative;
to receive a request to connect the call to a called party;
to query a calling party address book for a directory number associated with the called party;
to receive the directory number from the calling party address book if the directory number associated with the called party is located in the calling party address book;
to connect the calling party to a directory assistance service for obtaining a directory number for the called party if the directory number associated with the called party is not located in the calling party address book; and
whereby the voice interactive services node is further operative
to record a name and address provided by the calling party to the directory assistance service;
to record a directory number for the called party provided by the directory assistance service to the calling party; and
to perform a digit recognition on the directory number for the called party provided by the directory assistance service to determine whether the directory number provided by the directory assistance service is a valid directory number.

14. The system of claim 13, whereby the voice interactive services node is further operative
to convert a name and address provided by the calling party to the directory assistance service from an audio format to a digital format; and
to convert the recorded directory number for the called party provided by the directory assistance service to the calling party from an audio format to a digital format; and
to store the name of the called party provided by the calling party and the directory number for the called party provided by the directory assistance service in the calling party address book database for subsequent use.

15. A method for obtaining directory assistance information and for storms the obtained directory assistance information in a subscriber address book, comprising:
receiving a call at a voice services node of a telecommunications system for voice activated dialing services;
receiving a request at the voice services node to connect the call to a called party;
querying a calling party address book for a directory number associated with the called party;
if the directory number associated with the called party is located in the calling party address book, returning the directory number to the voice services node;
if the directory number associated with the called party is not located in the calling party address book, connecting the calling party to a directory assistance service for obtaining a directory number for the called party; and
after the step of connecting the calling party to a directory assistance service, further comprising;
recording by the voice services node a name and address provided by the calling party to the directory assistance service;
recording by the voice services node a directory number for the called party provided by the directory assistance service to the calling party; and
at the voice services node, performing a digit recognition on the directory number for the called party provided by the directory assistance service to determine whether the directory number provided by the directory assistance service is a valid directory number.

16. The method of claim 15, further comprising storing the name of the called party provided by the calling party and the directory number for the called party provided by the directory assistance service in the calling party address book database for subsequent use.

17. The method of claim 16, prior to storing the name of the called party provided by the calling party and the directory number for the called party provided by the directory assistance service in the calling party address book database, prompting the calling party from the voice services node to determine whether the calling party desires that the directory number for the called party provided by the directory assistance service is to be stored in the calling party address book database for subsequent use.

18. The method of claim 16, after storing the name of the called party provided by the calling party and the directory number for the called party provided by the directory assistance service in the calling party address book database, connecting the calling party to the called party via the directory number provided for the called party by the directory assistance service.

* * * * *

UNITED STATES PATENT AND TRADEMARK OFFICE
CERTIFICATE OF CORRECTION

PATENT NO. : 6,870,915 B2
APPLICATION NO. : 10/393103
DATED : March 22, 2005
INVENTOR(S) : Stillman et al.

It is certified that error appears in the above-identified patent and that said Letters Patent is hereby corrected as shown below:

In the Claims

Column 16, line 14, "party querying a calling" should read --party; querying a calling--.

Column 16, line 42, "name an address" should read --name and address--.

Column 18, line 4, "for storms the" should read --for storing the--.

Column 18, after line 2, please add the following Claim 40, which is omitted from the claims:

--The system of claim 39, whereby the voice interactive services node is further operative to connect the calling party to the called party via the directory number provided for the called party by the directory assistance service after storing the name of the called party provided by the calling party and the directory number of the called party provided by the directory assistance service in the calling party address book database.--

Signed and Sealed this

Sixteenth Day of October, 2007

JON W. DUDAS
*Director of the United States Patent and Trademark Office*